United States Patent [19]

Tanaka et al.

[11] Patent Number: 4,612,591
[45] Date of Patent: Sep. 16, 1986

[54] CASSETTE TAPE RECORDER WITH ROTARY ACTUATED EJECTION

[75] Inventors: Shinsaku Tanaka, Tokyo; Toshio Yoshimura, Kawasaki, both of Japan

[73] Assignee: Tanashin Denki Co., Ltd., Tokyo, Japan

[21] Appl. No.: 668,262

[22] Filed: Nov. 5, 1984

[30] Foreign Application Priority Data

Apr. 26, 1984 [JP] Japan .................................. 59-85045

[51] Int. Cl.⁴ ........................ G11B 5/008; G11B 15/24
[52] U.S. Cl. ..................................... 360/93; 360/96.5; 360/96.6
[58] Field of Search ........................ 360/93, 96.5, 96.6

[56] References Cited

U.S. PATENT DOCUMENTS 4,163,997 8/1979 Sugihara ........................... 360/96.5
4,441,129 4/1984 Nakao ............................... 360/96.5

Primary Examiner—Stuart N. Hecker
Assistant Examiner—Alyssa H. Bowler
Attorney, Agent, or Firm—Frishauf, Holtz, Goodman & Woodward

[57] ABSTRACT

In stopping a tape recorder and taking out a tape cassette, an ejecting operation member is softly pushed in and then released, and an ejection switch is temporarily turned off. Thereupon, an solenoid is deenergized, so that a rotation transmission control member is disengaged from a driven rotator to allow the driven rotator to engage a driving rotator. A movable contact of a motor switch is transferred from a second stationary contact to a first stationary contact. Thus, the rotatory force of a motor is transmitted to the driven rotator through the driving rotator. As the driven rotator rotates, an ejection mechanism is operated.

4 Claims, 17 Drawing Figures

CASSETTE TAPE RECORDER WITH ROTARY ACTUATED EJECTION

BACKGROUND OF THE INVENTION

The present invention relates to a cassette tape recorder which utilizes the rotatory force of a tape driving motor for ejecting a cassette, and which is capable of stopping the motor before the end of the ejecting operation.

It is highly advisable to utilize the rotatory force of a motor for ejecting a tape cassette to reduce the operating force. With this ejecting system, however, it is necessary to take the trouble to stop the motor after the cassette ejection.

SUMMARY OF THE INVENTION

The present invention is contrived in consideration of these circumstances, and it is an object of the invention to provide a cassette tape recorder capable of utilizing the rotatory force of a tape driving motor for ejecting a tape cassette and of stopping the motor before the end of the ejecting operation, thereby saving the trouble of a double operation.

Another object of the invention is to provide a cassette tape recorder permitting easy manual removal of a tape cassette even if it cannot be removed by rotatory force of a motor because of malfunctioning switches or other elements.

Still another object of the invention is to provide a cassette tape recorder capable of utilizing the rotatory force of a tape driving motor and also of readily changing the cassette ejection system between the motor and manual ejection, thereby reducing manufacturing cost.

A further object of the invention is to provide a cassette tape recorder capable of motor-driven tape cassette ejection based on the manual operation of a starting switch.

In order to attain the above objects of the invention, there is provided a cassette tape recorder which comprises a cassette holder movable between a cassette loading position and a cassette releasing position, a motor switch having first and second stationary contacts and a movable contact adapted to selectively touch the same and normally urged toward the first stationary contact side by a spring force, a tape driving motor one pole of which is connected to one terminal of a power source through the first stationary contact and the movable contact of the motor switch, and the other pole of which is connected to the other terminal of the power source, a changeover switch interposed between the second stationary contact of the motor switch and the one terminal of the power source, and adapted to be on when the cassette holder is in the cassette loading position and to be off when the cassette holder is in the cassette releasing position, an solenoid connected in series with a normally-closed ejection switch between the second stationary contact of the motor switch and the other terminal of the power source, and adapted to hold the movable contact of the motor switch on the second stationary contact side when excited, an ejecting operation member for temporarily turning off the ejection switch, a driving rotator normally rotated by the motor, a driven rotator adapted to hold the movable contact of the motor switch on the second stationary contact side when located in a first pause position off the driving rotator, and to be rotated by the rotatory force of the driving rotator when engaged therewith, an ejection mechanism actuated by the rotatory force of the driven rotator to move the cassette holder from the cassette loading position to the cassette releasing position, and a rotation transmission control member adapted to normally hold the driven rotator in the first pause position off the driving rotator, to hold the driven rotator in a second pause position off the driving rotator immediately before the driven rotator engages the driving rotator after once releasing the driven rotator, urged by the solenoid, when the solenoid is excited, and to hold the driven rotator again in the first pause position after releasing the driven rotator again to cause the driven rotator to engage the driving rotator so that the ejection mechanism is actuated when the solenoid is deenergized.

BRIEF DESCRIPTION OF THE DRAWINGS

FIGS. 1 to 12 show an embodiment of the present invention, in which:

FIG. 1 is a plan view showing a stop mode;

FIG. 2 is a side view as taken in the direction indicated by arrow II of FIG. 1;

FIG. 3 is a plan view showing an operating mode;

FIG. 4 is a side view as taken in the direction indicated by arrow IV of FIG. 3;

FIG. 5 is a disassembled perspective view of an ejecting operation unit;

FIG. 6 is a rear view showing the manner of mounting the ejecting operation unit;

FIGS. 7(a), 8(a), 9(a), 10(a), 11 and 12 are circuit diagrams for successively illustrating operation processes of a motor driving circuit.

DETAILED DESCRIPTION OF THE PREFERRED EMBODIMENTS

One embodiment of the present invention will now be described in detail with reference to the accompanying drawings.

Figure 1:
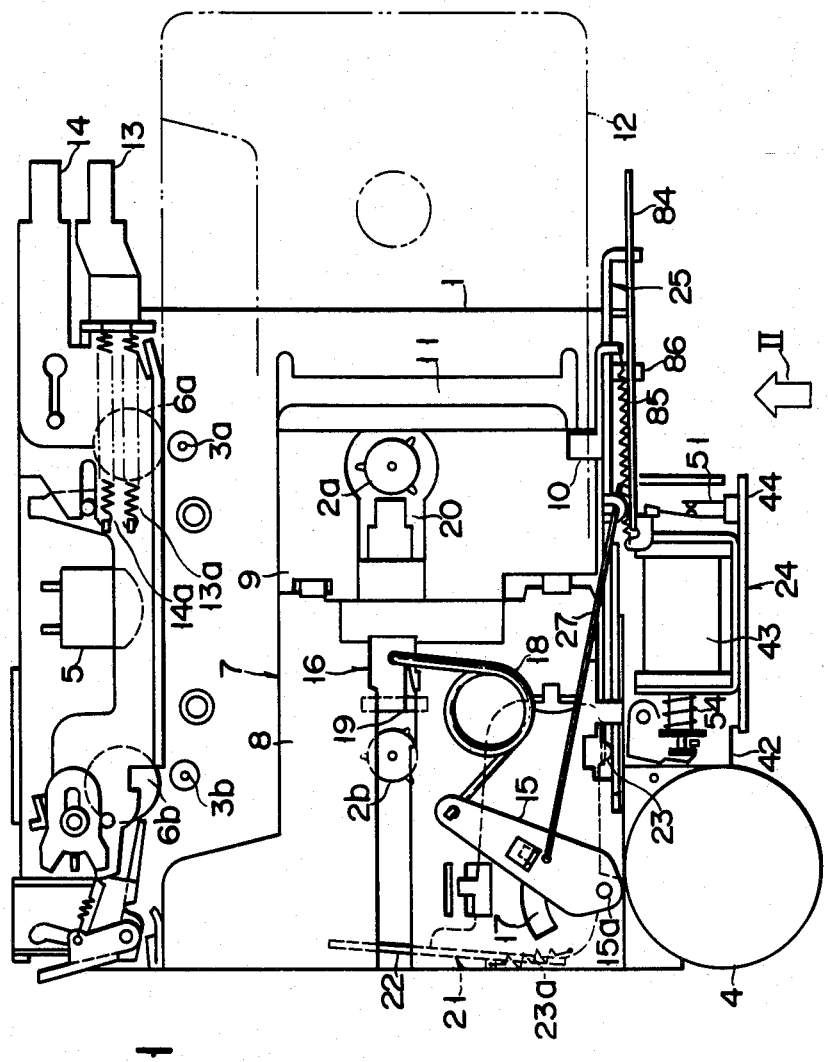

Referring now to the plan view of FIG. 1, there is shown a main chassis 1 which is mounted, on the upper surface side thereof, with a pair of reel shafts 2a and 2b, a pair of capstans 3a and 3b, and a tape driving mechanism including a motor 4 for rotating the reel shafts and the capstans. The motor 4 is adapted to simultaneously rotate the capstans 3a and 3b in their respective tape feed directions, and to selectively rotate the reel shaft 2a or 2b in its own tape winding direction.

Also, a recording/reproducing magnetic head 5 and a pair of pinch rollers 6a and 6b corresponding to the capstans 3a and 3b, respectively, are set on the upper surface of the main chassis 1.

A cassette holder 7 is further mounted on the top of the main chassis 1. The cassette holder 7 comprises a rocking plate 8 rockable in the vertical direction (perpendicular to the drawing plane of FIG. 1) around the left end edge as in FIG. 1, and a cassette loading member 9 vertically rockable around the right end edge of the rocking plate 8. The upward rocking motion of the rocking plate 8 is restricted by a stopper 10 which is formed on the upper portion of the side wall of the main chassis 1. By the use of the stopper 10, the rocking plate 8 and the cassette loading member 9 are held substantially parallel to the main chassis 1 when they are rocked upward.

The cassette loading member 9 has a cassette loading opening 11 on the right end side of FIG. 1 through which a tape cassette 12 can be inserted into or removed from the cassette loading member 9. If the rocking plate 8 is rocked downward with the tape cassette 12 in the cassette loading member 9, then the tape cassette 12 is set on the reel shafts 2a and 2b and the capstans 3a and 3b. The position where the tape 12 is set on the reel shafts 2a and 2b and the capstans 3a and 3b after the downward rocking of the rocking plate 8 will herein be referred to as a "cassette loading position" of the cassette holder 7. The position where the tape cassette 12 is allowed to be inserted or removed through the cassette loading opening 11 after the upward rocking of the rocking plate 8 will herein be referred to as a "cassette releasing position" of the cassette holder 7.

When the cassette holder 7 moves from the cassette releasing position to the cassette loading position, the magnetic head 5 moves downward as in FIG. 1 in association therewith, and is inserted into the tape cassette 12 to come into contact with a magnetic tape therein. When the magnetic head 5 is thus inserted into the tape cassette 12, the pinch roller on the same side with that reel shaft driven by the motor 4 is pressed against the capstan on the same side in an interlocked manner. For example, while the right-hand reel shaft 2a is being driven, the right-hand pinch roller 6a is in contact with the right-hand capstan 3a. Thus, the magnetic tape is fed rightward (or leftward) for recording or reproducing.

In FIG. 1, numerals 13 and 14 designate operating members for fast-feed operation. Arranged in layers above the magnetic head 5, the operating members 13 and 14 can advance and retreat from side to side or in the horizontal direction of FIG. 1. The operating members 13 and 14 are normally urged rightward by tension springs 13a and 13b, respectively. When the one operating member 13 is moved to the left, the rotatory force of the motor 4 is transmitted as high-speed rotation to the right-hand reel shaft 2a. When the other operating member 14 is moved to the left, the rotatory force of the motor 4 is transmitted as high-speed rotation to the left-hand reel shaft 2b.

A spring bearing member 15 is rockably mounted on the upper surface of the rocking plate 8 so that one end of the member 15 is pivotally supported on a shaft 15a.

The rocking plate 8 is further fitted with an ejection member 16 slidable along the cassette loading or unloading direction (horizontal direction of FIG. 1).

The spring bearing member 15 is located so that its other end (i.e., the rocking end) faces the ejection member 16, and its rocking motion is restricted by an arcuate hole 17 which is formed in the rocking plate 8. An ejection spring 18 formed of an extension spring is interposed between the ejection member 16 and the other end of the spring bearing member 15.

The ejection member 16 has, at one end thereof (left end of FIG. 1), an abutting portion 19 against which abuts the tape cassette 12 inserted into the cassette loading member 9. Formed at the other end of the ejection member 16 is an engaging claw portion 20 which engages one reel hub hole of the tape cassette 12 in the cassette loading member 9.

A platelike retaining member 21 is mounted on the lower surface side of the rocking palte 8 so as to be rockable on the same axis of the spring bearing member 15. The retaining member 21 has an abutting piece 22 located on the line of action of the ejection member 16, and a retaining portion 23 adapted to selectively engage the upper edge of the side wall of the main chassis 1, thereby holding the cassette holder 7 in its operating position. The retaining member 21 is normally urged by a tension spring 23a to rock in a direction such that the retaining portion 23 engages the upper edge of the side wall of the main chassis 1.

An ejecting operation unit 24 is attached to one side portion (lower side portion of FIG. 1) of the main chassis 1. The ejecting operation unit 24 will be described in detail later.

Figure 2:
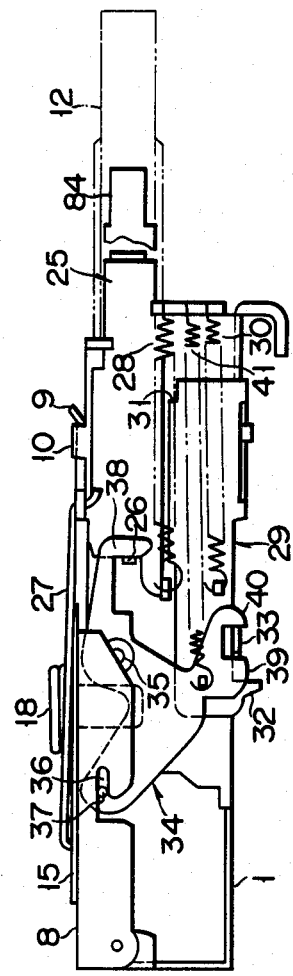

FIG. 2 is a side view as taken in the direction indicated by arrow II of FIG. 1. The motor 4 and the ejecting operation unit 24 are omitted in FIG. 2.

As shown in FIG. 2, a pressure transmission member 25 is attached to the outer surface of the side wall of the main chassis 1 so as to be movable in the horizontal direction of FIGS. 1 and 2. The pressure transmission member 25 has an engaging portion 26 bent at its left end portion, and is coupled to the spring bearing member 15 by means of a coupling rod 27. The pressure transmission member 25 is normally urged rightward by a return spring 28 formed of a tension spring. When the pressure transmission member 25 is moved to the right (in the returning direction) by the return spring 28, as shown in FIGS. 1 and 2, the spring bearing member 15 is rocked also to the right (in the returning direction), as shown in FIG. 1. When the pressure transmission member 25 is moved to the left against the urging force of the return spring 28, the spring bearing member 15 is rocked to the left (in the forward direction) at the same time.

Figure 4:
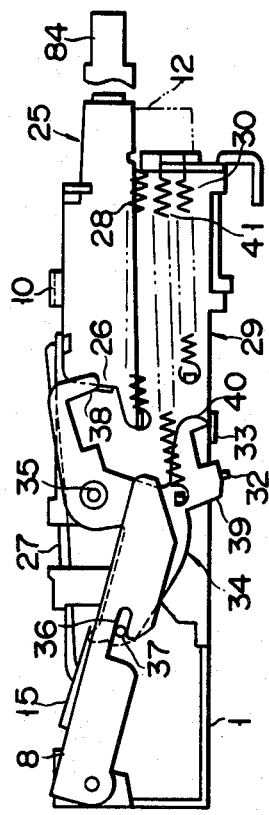

Under the pressure transmission member 25, a platelike operating force transmission member 29 is attached to the outer surface of the side wall of the main chassis 1 so as to be movable from side to side or in the horizontal direction of FIG. 2. The operating force transmission member 29 is normally urged rightward by a return spring 30 formed of a tension spring. When the pressure transmission member 25 moves to the left, the operating force transmission member 29 receives the pressure from the pressure transmission member 25 at its pressure receiving portion 31, and moves together with the pressure transmission member 25 to the left. The operating force transmission member 29 has a switch operating piece 32 and a bent engaging piece 33. The switch operating piece 32 serves to operate a changeover switch 50 for selection of circuits between the tape recorder and a radio (not shown) combined therewith. The changeover switch 50, which is one of the components of the ejecting operation unit 24, will be described in detail later. When the operating force transmission member 29 is at its left-hand motion limit, as shown in FIG. 2, the changeover switch 50 enables the radio to be turned on. On the other hand, when the operating force transmission member 29 is at its right-hand motion limit, as shown in FIG. 4, the changeover switch 50 allows the tape recorder to be set in operation.

In front or on the left (FIG. 2) of the pressure transmission member 25 and the operating force transmission member 29, a platelike interlocking member 34 is attached to the outer surface of the side wall of the main chassis 1 so as to be rockable around a shaft 35. The interlocking member 34, along with the spring bearing member 15, the ejection member 16, the ejection spring 18, and the retaining member 21, constitutes an ejection mechanism. The interlocking member 34 has a coupling pin 37 to be fitted in a slit 36 in the side wall of the rocking plate 8 of the cassette holder 7, a pressure receiving piece 38 to receive the pressure from the engaging portion 26 of the pressure transmission member 25, and engaging projections 39 and 40 in front and in the rear, respectively, of the engaging piece 33 of the operating force transmission member 29. The interlocking member 34 is normally urged to rock in the counterclockwise direction of FIG. 2 by a tension spring 41 for pressing the cassette holder 7 downward.

Figure 5:
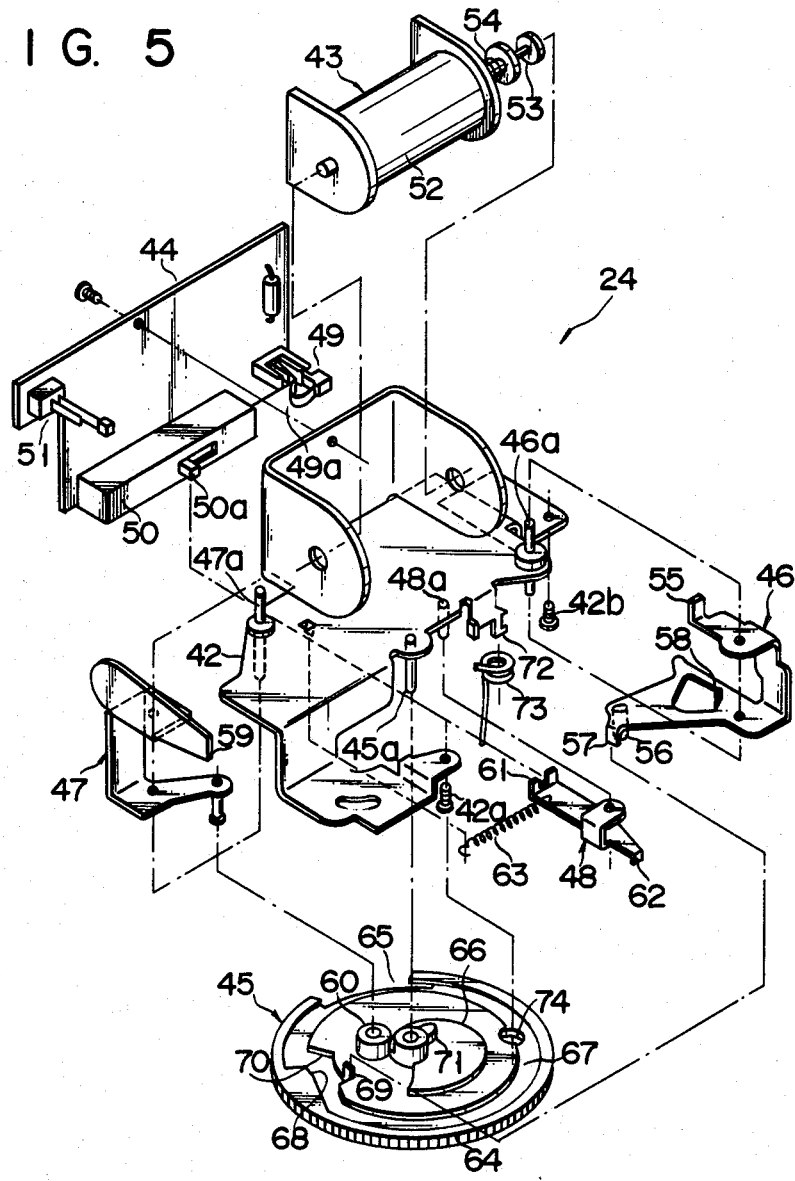

FIG. 5 shows the construction of the ejecting operation unit 24. An ejecting operation unit chassis 42 is fitted with an solenoid 43, a printed circuit board 44, a driven rotator 45, a rotation transmission control member 46, a power transmission member 47, and a switch operating member 48. Further, a motor switch 49, the changeover switch 50, and an ejection switch 51 are attached to the ejecting operation unit chassis 42 by means of the printed circuit board 44. The ejection switch 51, which originally is of a normally-open type, is normally held "on" by an ejecting operation member 84 as is mentioned later. The ejecting operation unit chassis 42 is fixed to the back side of the main chassis 1 by means of two screws 42a and 42b (see FIG. 6).

The solenoid 43 includes a coil 52 and a plunger 53 capable of advance and retreat. The plunger 53, which is normally urged to project by a spring 54, is drawn into the coil 52 when the coil 52 is energized.

The rotation transmission control member 46, the power transmission member 47, and the switch operating member 48 are attached to the ejecting operation unit chassis 42 for horizontal rocking motion by means of shafts 46a, 47a and 48a, respectively.

The rotation transmission control member 46 is substantially U-shaped, and has a plunger engaging piece 55 at the extreme end of its upper piece portion which engages the plunger 53 of the solenoid 43. A cam pin 56, a trigger retaining piece 57, and a switch operating piece 58 for operating a movable contact 49a of the motor switch 49 are formed on the lower piece portion of the rotation transmission control member 46.

The power transmission member 47 is also substantially U-shaped, and has a transmission member engaging piece 59 which rises up from one side of its upper piece portion. A cam roller 60 is rotatably mounted on the extreme end of the lower piece portion of the power transmission member 47.

One end of the switch operating member 48 serves as a switch engaging piece 61 to engage a transfer piece 50a of the changeover switch 50, and the other end as a transmission member engaging piece 62 to engage the operating force transmission member 29. The switch operating member 48 is normally urged to rock counterclockwise by a spring 63 which is stretched between the switch operating member 48 and the ejecting operation unit chassis 42. Thus, the changeover switch 50 is normally held on the radio side (or tape-recorder-off side).

The driven rotator 45 is mounted on the ejecting operation unit chassis 42 for horizontal rotation by means of a shaft 45a. A gear 64 is provided on the outer periphery of the driven rotator 45, and a partial cut portion 65 is formed in the gear 64. A volute cam 66 to engage the cam pin 56 is mounted on the central portion of the upper surface of the driven rotator 45. A cam groove 67 to engage the cam pin 56 is formed in the peripheral portion of the upper surface of the driven rotator 45. The cam surface of the volute cam 66 is designed so that the distance between the cam surface and the center of rotation gradually increases with the increase of rotation angle caused while the driven rotator 45 makes one revolution. A stop position holding protrusion 68 protrudes from part of the outer peripheral edge of the cam groove 67 toward the center of rotation. A stop position holding projection 69 and a next-stage position holding recess 70 are formed on and in the inner peripheral edge of the cam groove 67, corresponding to the stop position holding protrusion 68. Further, a pressure receiving projection 71 protrudes from the upper surface of the volute cam 66. One end of a torsion spring 73 held on a bent piece 72 of the ejecting operation unit chassis 42 elastically abuts against the top end of the pressure receiving projection 71. A tool access hole 74 is bored through the driven rotator 45. The screw 42a and a screwdriver or other tool can be inserted through the hole 74 in attaching the ejecting operation unit chassis 42 to the main chassis 1 (see FIG. 6).

Figure 7A:
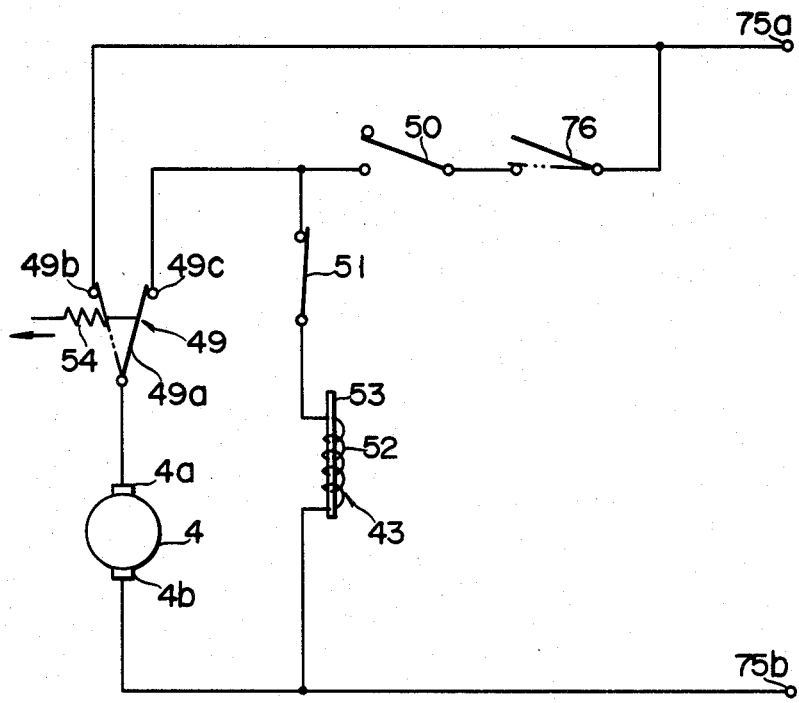

Referring now to FIG. 7(a), the relationships between the motor 4, the solenoid 43, the motor switch 49, the changeover switch 50, the ejection switch 51, etc. will be explained.

FIG. 7(a) shows a stop mode of the tape recorder, in which one pole 4a of the motor 4 is connected to one terminal 75a of a power source through a first stationary contact 49b and the movable contact 49a of the motor switch 49, and the other pole 4b of the motor 4 is connected to the other terminal 75b of the power source. The changeover switch 50 and a starting switch 76 are connected in series between a second stationary contact 49c of the motor switch 49 and the one terminal 75a of the power source. If the tape recorder is used as an attachment for a car, then the starting switch 76 corresponds to the engine starter switch of the car. The coil 52 of the solenoid 43 is connected in series with the ejection switch 51 between the second stationary contact 49c and the other pole 75b of the power source.

The elastic force of the spring 54 is transmitted to the movable contact 49a of the motor switch 49 through the rotation transmission control member 46, so that the movable contact 49a is normally urged toward the first stationary contact 49b. When the tape recorder is in the stop mode, the movable contact 49a is in touch with the second stationary contact 49c, urged by the action of the driven rotator 45, as described in detail later.

Figure 7B:
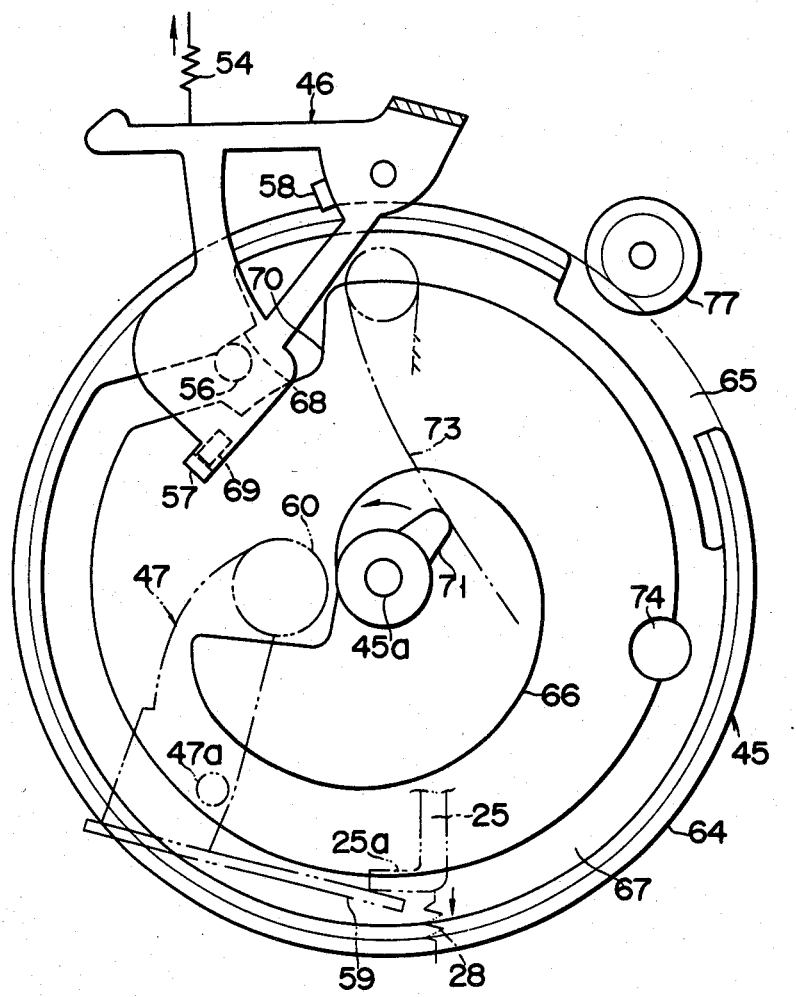
FIGS. 7(b), 8(b), 9(b) and 10(b) are plan views for successively illustrating processes of operation of a driven rotator and its surroundings.

FIG. 7(b) shows the relationships between the driven rotator 45, the rotation transmission control member 46, the power transmission member 47, the torsion spring 73, the pressure transmission member 25, etc.

FIG. 7(b) shows the stop mode of the tape recorder, which corresponds to the state shown in FIG. 7(a). In FIG. 7(b), the torsion spring 73 presses on the top end of the pressure receiving projection 71, thereby applying a counterclockwise torque (indicated by an arrow) to the driven rotator 45. The trigger retaining piece 57 of the rotation transmission control member 46 engages the stop position holding projection 69, thereby preventing the driven rotator 45 from rotating counterclockwise. Although the rotation transmission control member 46 is urged clockwise by the spring 54, it is prevented from rocking clockwise as the cam pin 56 engages the stop position holding protrusion 68. The switch operating piece 58 of the rotation transmission control member 46 holds the movable contact 49a of the motor switch 49 on the second stationary contact side, as shown in FIG. 7(a). The power transmission member 47 causes the cam roller 60 to face the minimum-diameter portion of the volute cam 66. Also, the transmission member engaging piece 59 of the power transmission member 47 is opposed to a bent piece 25a on the pressure transmission member 25 so that it is subject to the elastic force of the return spring 28 (see FIG. 2).

Figure 6:
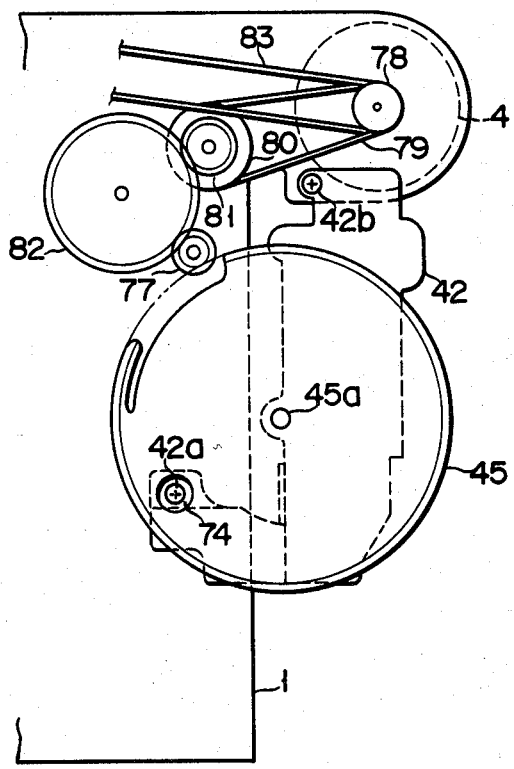

In FIG. 7(b), numeral 77 designates a driving gear as a driving rotator which is rotatably mounted on the main chassis 1. As shown in FIG. 6, the driving gear 77 is normally driven by the motor 4 through the medium of a motor pulley 78, an endless belt 79, an intermediate pulley 80, and intermediate gears 81 and 82. The driving gear 77 can mesh with the gear 64 of the driven rotator 45. In the stop mode of the tape recorder shown in FIG. 7(b), however, the cut portion 64 of the driven rotator 45 faces the driving gear 77, so that a rotatory force transmission path extending from the driving gear 77 to the driven rotator 45 is cut off. In FIG. 6, numeral 83 designates an endless belt for transmitting the rotatory force of the motor 4 to the capstans 3a and 3b through the motor pulley 78. The rotatory force of the motor 4 is selectively transmitted also to the reel shafts 2a and 2b through the gears 81 and 82.

Turning again to FIGS. 1 and 2, an ejecting operation member 84 is mounted on the outer surface of the side wall of the main chassis 1 for horizontal motion as illustrated, overlapping the pressure transmission member 25. The ejecting operation member 84 is urged rightward by a return spring 85 stretched between itself and the main chassis 1, thereby holding the ejection switch 51 in the "on" state. First, the ejection switch 51 is opened by pushing in the ejecting operation member 84 to the left against the urging force of the return spring 85. Then, the ejecting operation member 84 is further pushed in to press a guide pin 86 fixed on the pressure transmission member 25, thereby moving the pressure transmission member 25.

The operation of the tape recorder according to the present embodiment will now be described.

FIGS. 1, 2, 7(a) and 7(b) show the stop mode of the tape recorder. In this state, the ejection member 16 is located in its right-hand motion limit, urged by the elastic force of the ejection spring 18. The cassette holder 7 is in its stop position off the main chassis 1, and the retaining portion 23 of the retaining member 21 engages the upper edge of the side wall of the main chassis 1, thereby preventing the cassette holder 7 from moving to the cassette loading position. The spring bearing member 15 is subjected to the elastic force of the return spring 28 transmitted through the coupling rod 27 and the pressure transmission member 25, and is moved in its returning direction (direction to energize the ejection spring 18). The operating force transmission member 29 is prevented from being restored to the right by the return spring 30, having its engaging piece 33 caught by the engaging projection 40 of the interlocking member 34, as shown in FIG. 2. In this position, the operating force transmission member 29 causes the switch operating member 48 to rock in the counterclockwise direction of FIG. 5, thereby holding the changeover switch 50 in the off state. Although the interlocking member 34 is urged to rock in the counterclockwise direction of FIG. 2 (direction in which the cassette holder 7 is moved to the cassette loading position) by the elastic force of the return spring 30 and the cassette backup spring 41, it is prevented from rocking in that direction due to the engagement between the slit 36 and the coupling pin 37. The ejection switch 51 is held "on" by the ejecting operation member 84, and the movable contact 49a of the motor switch 49 is brought into touch with the second stationary contact 49c by the rotation transmission control member 46. The driven rotor 45 is held in a first pause position as the stop position holding projection 69 engages the trigger retaining piece 57 of the rotation transmission control member 46.

If the starting switch 76 is turned on (e.g., an engine key is inserted in the keyhole and turned to start the engine), as indicated by an imaginary line in FIG. 7(a), and if the tape cassette 12 is longitudinally inserted substantially parallel to the main chassis 1 through the cassette loading opening 11 into the cassette holder 7, then the ejection member 16 located on the line of insertion of the tape cassette 12 moves forward against the urging force of the ejection spring 18.

As the ejection member 16 moves in this manner, the degree of elastic deformation of the ejection spring 16 increases gradually. When the ejection member 16 moves past the position for the maximum degree of elastic deformation, the elastic force of the ejection spring 18 acts so as to move the ejection member 16 in its forward direction. Thus, the tape cassette 12 is drawn into the cassette holder 7 by the elastic force of the ejection spring 18 without requiring any external force to push it in.

Then, the ejection member 16 abuts against the abutting piece 22 of the retaining member 21 to rock the retaining member 21 against the urging force of the tension spring 24. Thereupon, the retaining portion 23 of the retaining member 21 is disengaged from the upper edge of the side wall of the main chassis 1 (see FIG. 3), so that the rocking plate 8 of the cassette holder 7 and the interlocking member 34 rock downward, urged by the elastic force of the return spring 30 and the cassette backup spring 41. As a result, the cassette loading member 9 is lowered to the cassette loading position to allow the tape cassette 12 to be set on the reel shafts 2a, 2b and the capstans 3a, 3b (see FIG. 4). As the cassette loading member 9 lowers in this manner, the magnetic head 5 moves toward the tape cassette 12 to come into contact with the magnetic tape therein.

FIGS. 3, 4, 8(a) and 8(b) show a state corresponding to the cassette loading position of the cassette loading member 9 in which the cassette holder 12 is located in its operating position. In this state, the engaging piece 33 of the operating force transmission member 29 is disengaged from the engaging projection 40 as the interlocking member 34 is rocked, so that the operating force transmission member 29 is restored to its right-hand motion limit by the return spring 30. As the switch operating piece 32 of the member 29 moves correspondingly, the changeover switch 50 is shifted to start the motor 4 (see FIG. 8(a)). At the same time, the solenoid 43 is excited to rotate the rotation transmission control member 46 slightly in the counterclockwise direction. Accordingly, the trigger retaining piece 57 of the rotation transmission control member 46 is disengaged from the stop position holding projection 69 of the driven rotor 45, so that the driven rotator 45 is rotated counterclockwise by the elastic force of the torsion spring 73. Before the gear 64 engages the driving gear 77, however, the driven rotator 45 is held in a second pause position shown in FIG. 8(b) as the cam pin 56 engages the next-stage position holding recess 70. As the motor 40 rotates, the reel shafts 2a or 2b rotates, and both of the capstans 3a, 3b rotate in their respective tape winding directions. At the same time, the pinch roller 6a or 6b on the same side with the rotated reel shaft 2a or 2b is pressed against its corresponding capstan 3a or 3b to feed the tape for, e.g., reproducing operation. When the tape is wound up to its end, a reverse mechanism (not shown) is actuated to change the tape feed direction, and the reproducing operation is continued.

Figure 9A:
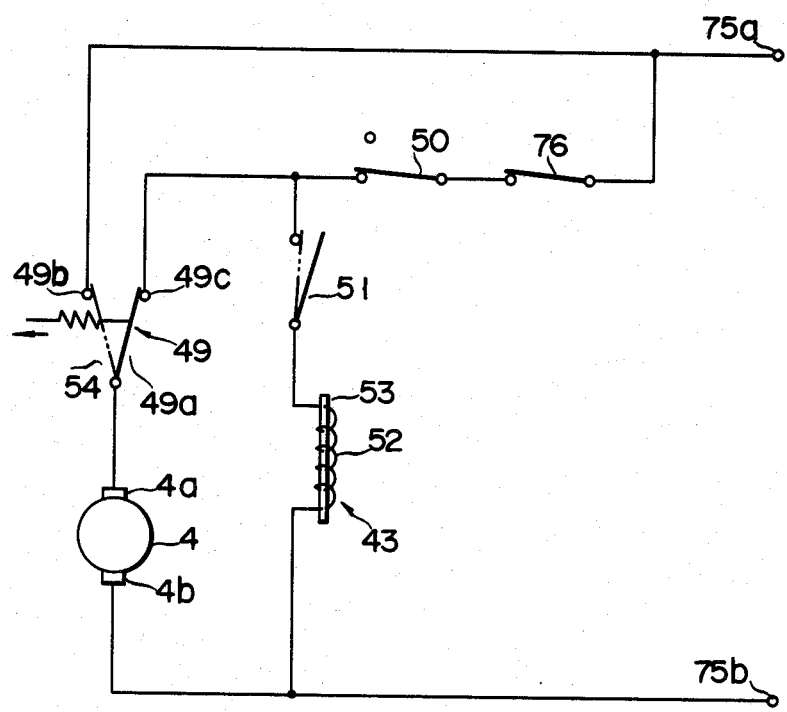
Figure 9B:
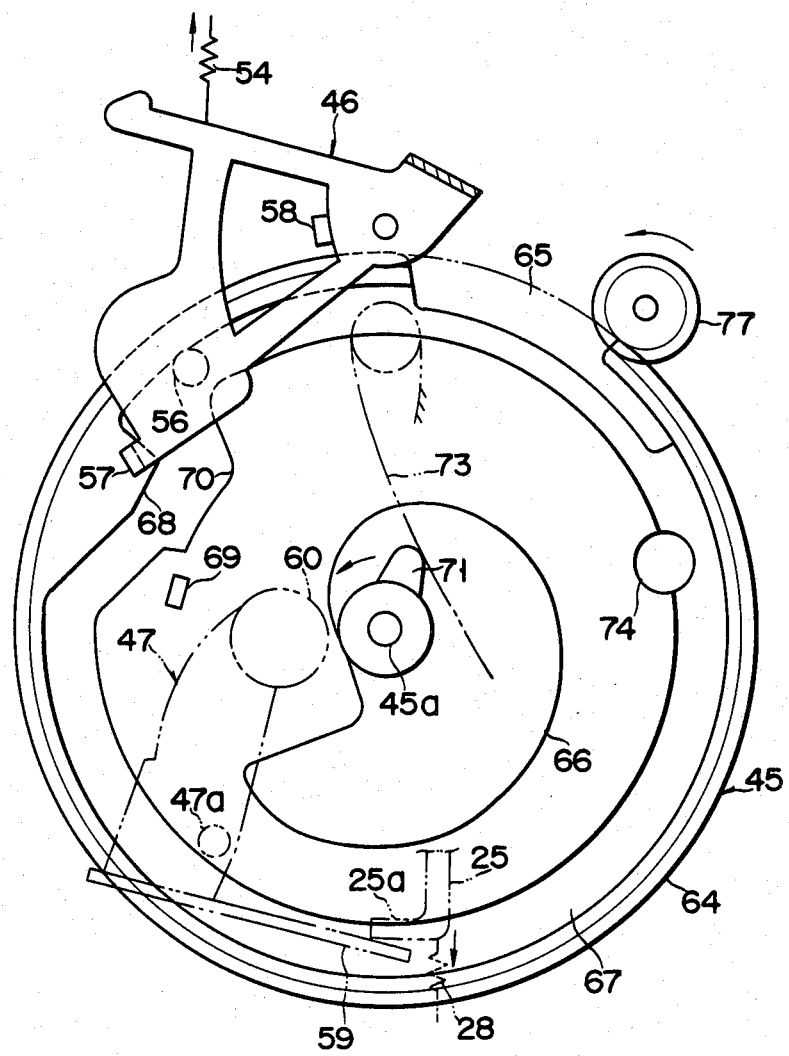

Subsequently, in stopping the tape recorder and taking out the tape cassette 12 therefrom, the ejecting operation member 84 is softly pushed in to the left of FIG. 1 against the urging force of the return spring 85, and is then released. At this time, the ejecting operation member 29 temporarily causes the ejection switch 51 to turn off, as shown in FIG. 9(a). Accordingly, the solenoid 43 is deenergized, so that the rotation transmission control member 46 is rocked clockwise by the spring 54 to disengage its cam pin 56 from the next-stage position holding recess 70, as shown in FIG. 9(b). As a result, the driven rotator 45 is rotated counterclockwise by the urging force of the torsion spring 73 until it engages the driving gear 77.

Figure 10A:
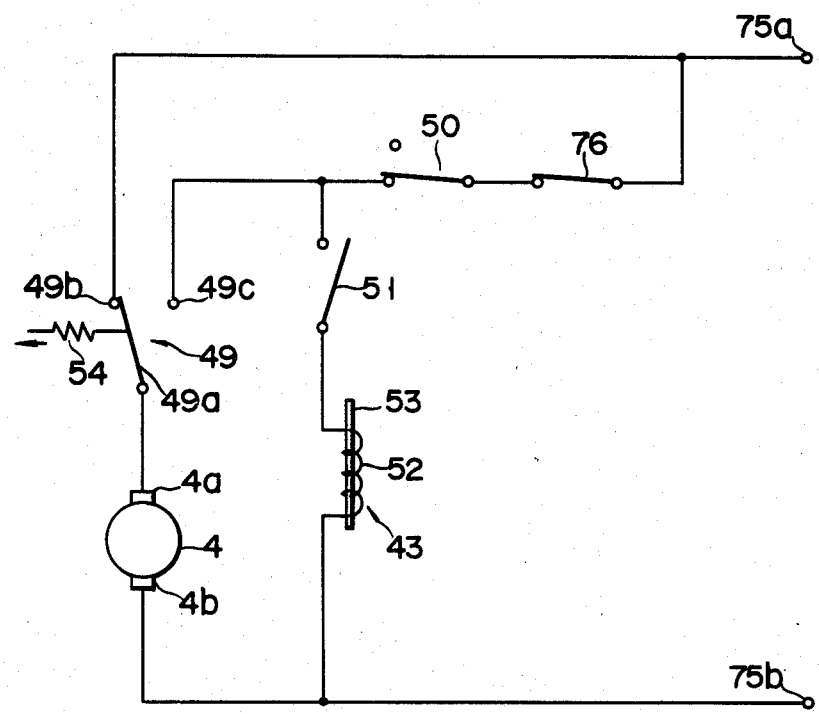
Figure 10B:
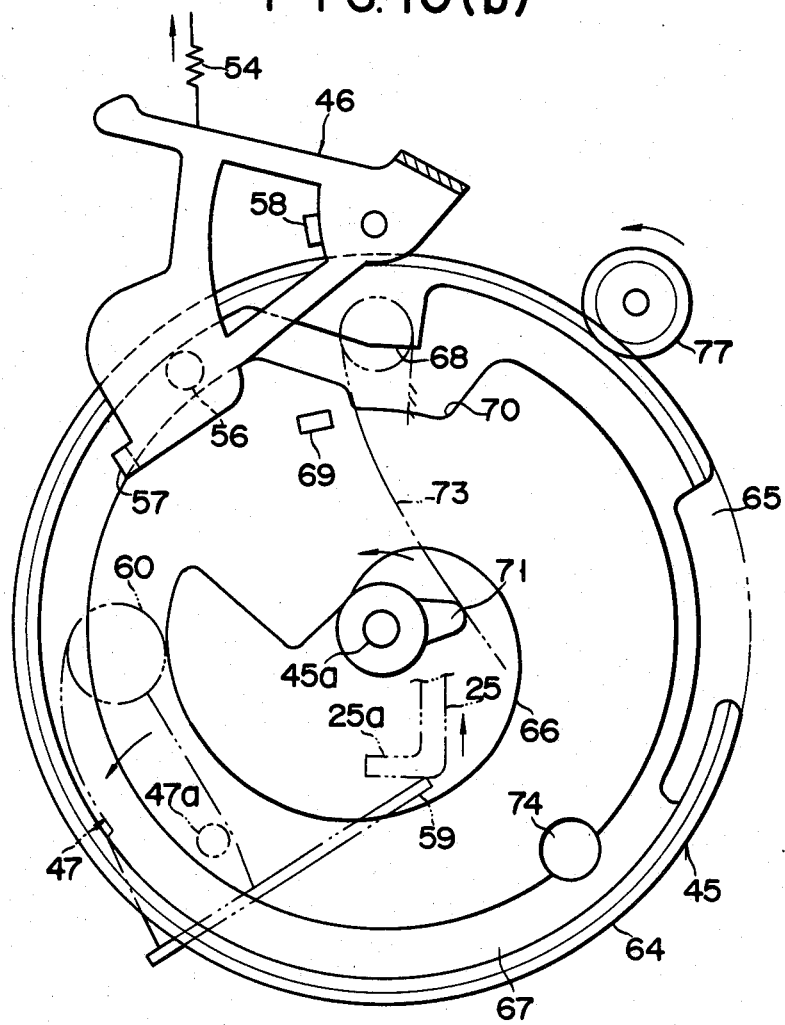

As the rotation transmission control member 46 rocks in the clockwise direction, its switch operating piece 58 transfers the movable contact 49a of the motor switch 49 to the side of the first stationary contact 49b, as shown in FIG. 10(a). Thereupon, the motor 4 is connected to the power source through the movable contact 49a and the first stationary contact 49b. Thus, the rotatory force of the motor 4 is transmitted to the driven rotor 45 through the driving gear 77. As the driven rotator 45 rotates, the volute cam 66 presses the cam roller 60 to rock the power transmission member 47 widely in the counterclockwise direction, as shown in FIG. 10(b). As a result, the transmission member engaging piece 59 of the power transmission member 47 strongly presses the bent piece 25a of the pressure transmission member 25, so that the pressure transmission member 25 presses the pressure receiving portion 31 of the operating force transmission member 29 to move the operating force transmission member 29 in the same direction.

Figure 11:
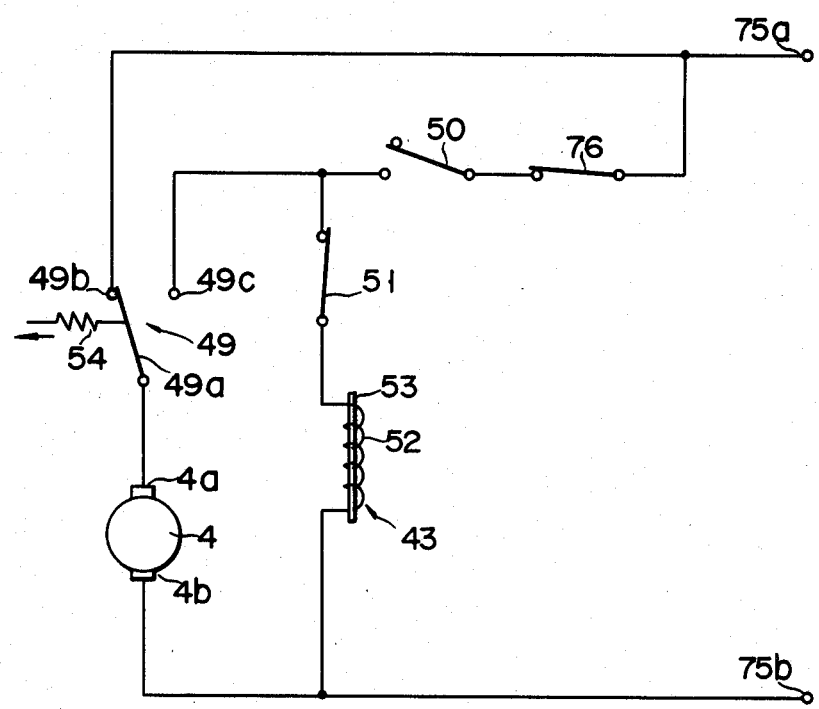

Thereupon, the changeover switch 50 is transferred again to the "off" side (for the operation of the radio), as shown in FIG. 11, and the engaging piece 33 presses the engaging projection 39 of the interlocking member 34, thereby rocking the interlocking member 34 in the clockwise direction of FIG. 4. Thus, the rocking plate 8 rocks counterclockwise, so that the cassette loading member 9 rises up to the cassette releasing position, where the tape cassette 12 is allowed to be removed upward from the reel shafts 2a, 2b and the capstans 3a, 3b.

Figure 3:
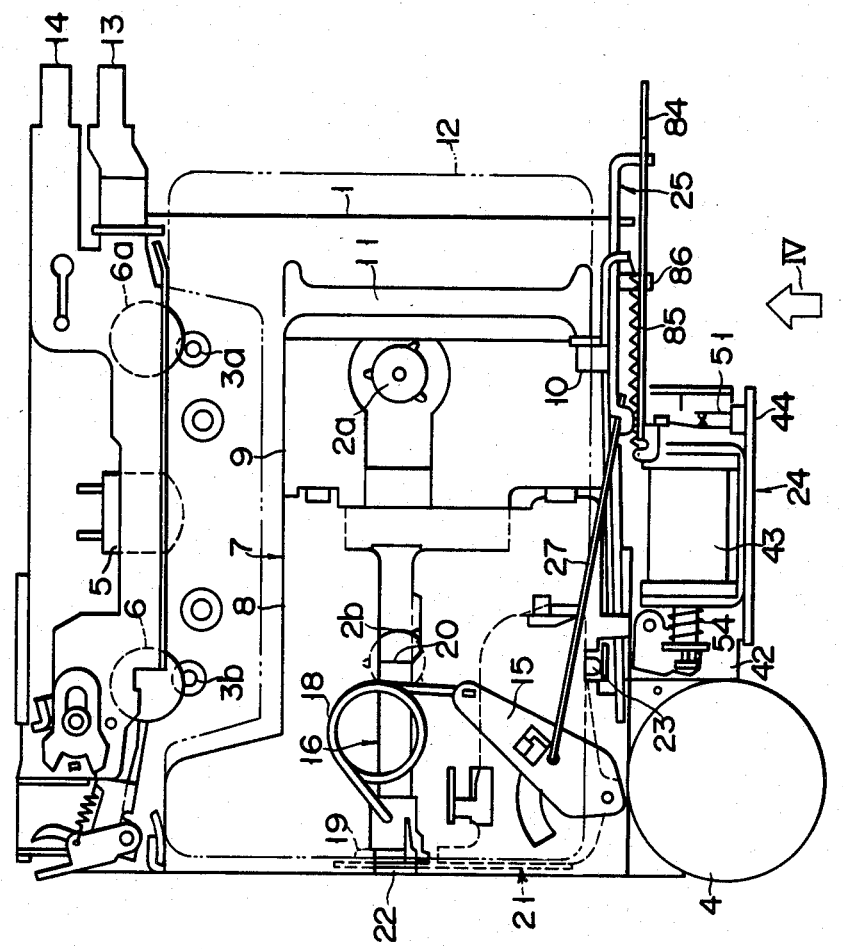

As the pressure transmission member 25 moves in the aforesaid manner, the spring bearing member 15 is rocked in the counterclockwise direction of FIG. 3 or in the forward direction through the medium of the coupling rod 27, causing the ejection spring 18 to turn around. Accordingly, the ejection member 16 moves to the right of FIG. 3, urged by the elastic force of the ejection spring 18, so that the tape cassette 12 is moved in the direction for removal. The retaining member 21 is restored in the clockwise direction by the tension spring 23a, so that its retaining portion 23 is held on the upper edge of the side wall of the main chassis 1.

Meanwhile, the cam roller 60 is disengaged from the volute cam 66, so that the power transmission member 47, along with the pressure transmission member 25, is restored to its initial position by the return spring 28. Then, the cam pin 56 of the rotation transmission control member 46 runs again onto the stop position holding protrusion 68 of the driven rotator 45, thereby rocking the rotation transmission control member 46 counterclockwise against the urging force of the spring 54. As a result, the movable contact 49a of the motor switch 49 is transferred to the side of the second stationary contact 49c, so that the motor 4 is stopped (see FIG. 7(a)). At this time, although the gear 64 of the driven rotator 45 is not in engagement with the driving rotator 77, the urging force of the torsion spring 73 acts on the pressure receiving projection 71 to rotate the driven rotator 45 to its initial position shown in FIG. 7(b).

In the operation described above, the ejecting operation member 84 is softly pushed in to turn the ejection switch 51 temporarily off, so that the rotatory force of the motor 4 is transmitted to the driven rotator 45 to be utilized for ejecting operation. The same result may, however, be produced by turning off the starting switch 76.

Figure 8A:
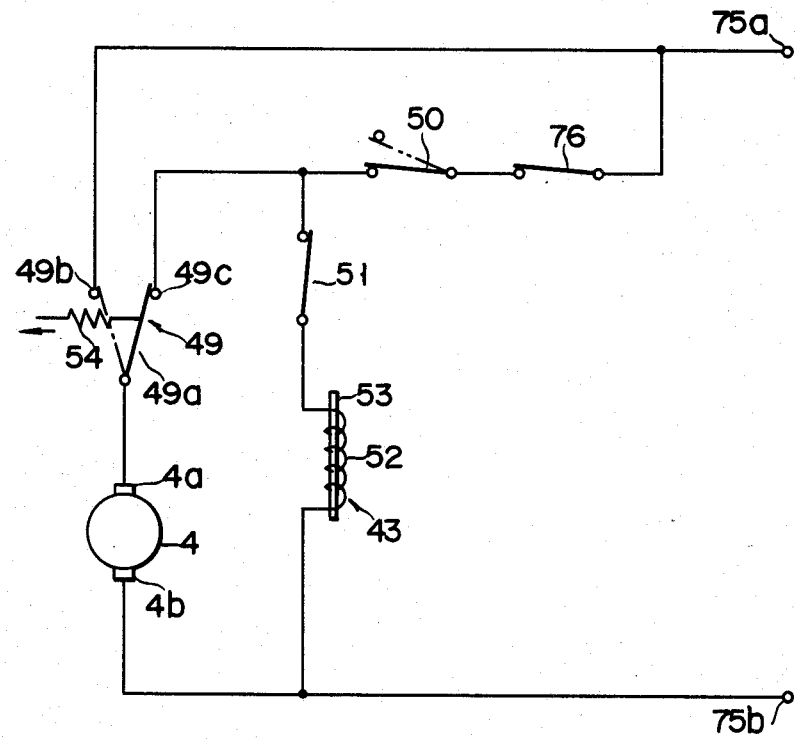
Figure 8B:
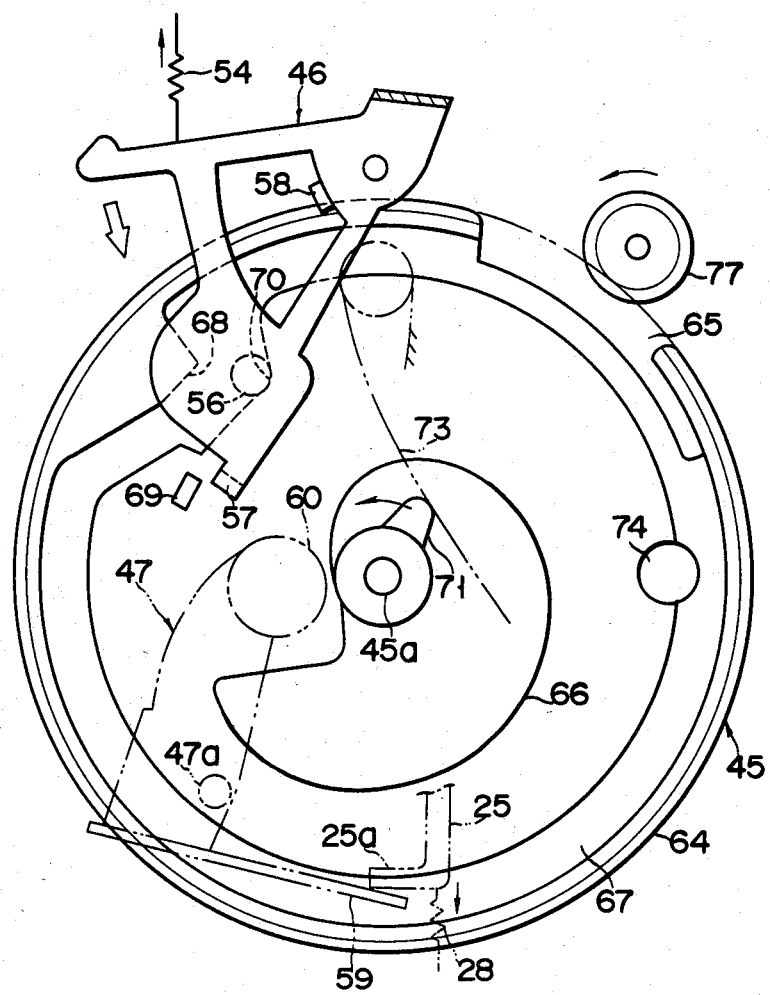
Figure 12:
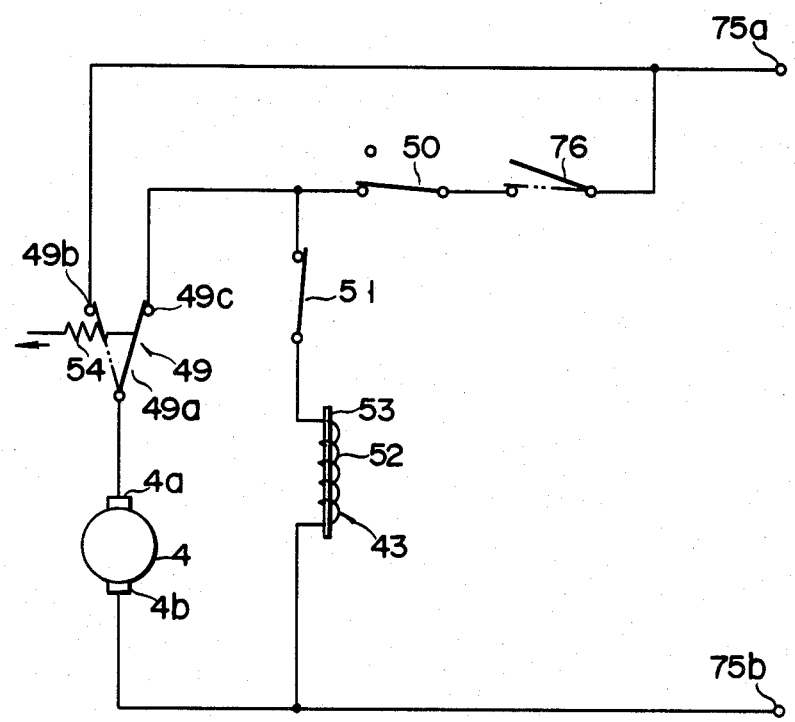

If the starting switch 51 is temporarily turned off, as shown in FIG. 12, in the reproducing mode shown in FIGS. 8(a) and 8(b), the solenoid 43 is deenergized. Thereafter, the ejecting operation is performed by following the same procedure as is taken when the ejection switch 51 is temporarily turned off. Thus, the tape recorder may automatically be stopped with the ejecting operation by turning off the engine starter switch.

If the automatic stop and ejecting operation based on the rotatory force of the motor 4 should fail due to a malfunction in the electrical system, it can still be operated by strongly pushing in the ejecting operation member 84 to transmit the operating force directly to the pressure transmission member 25 for its movement.

As described above, moreover, the motor switch 49, the changeover switch 50, the solenoid 43, the rotation transmission control member 46 and other members are integrally mounted on the ejecting operation unit chassis 42 for unit construction. Therefore, these members may be assembled by simply fixing the ejecting operation unit chassis 42 to the main chassis 1 by means of the screws 42a, 42b. Thus, the maintenance and inspection of the tape recorder is easy.

Figure 13:
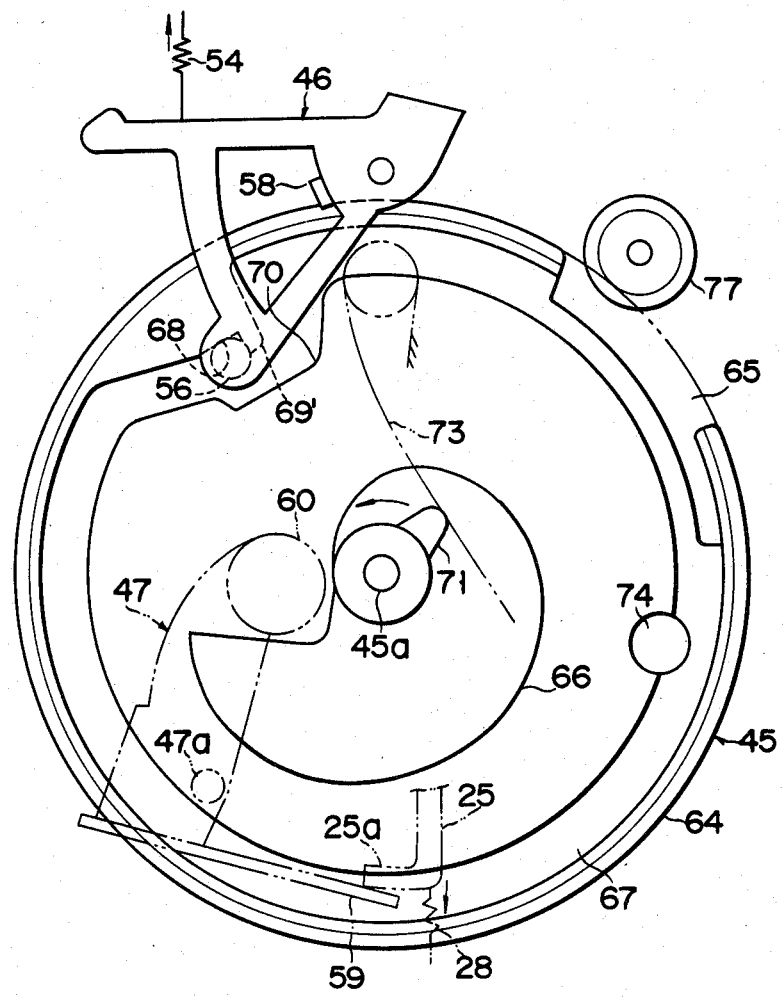
FIG. 13 is a plan view showing a driven rotator and its surroundings according to another embodiment of the invention.

Although an illustrative embodiment of the present invention has been described in detail herein, the invention is not limited to this embodiment. For example, the stop position holding projection 69 of the rotation transmission control member 46 and the trigger retaining piece 57 corresponding thereto may be omitted if a stop position holding projection 69' is formed on the stop position holding protrusion 68 of the driven rotator 45, as shown in FIG. 13.

What is claimed is:
1. A cassette tape recorder comprising:
 a cassette holder movable between a cassette loading position and a cassette releasing position;
 a motor switch having first and second stationary contacts and a movable contact adapted to selectively touch the same and normally urged toward the first stationary contact side by a spring force;
 a tape driving motor one pole of which is connected to one terminal of a power source through the first stationary contact and the movable contact of the motor switch, and the other pole of which is connected to the other terminal of the power source;
 a changeover switch interposed between the second stationary contact of the motor switch and the one terminal of the power source, and adapted to be on when the cassette holder is in the cassette loading position and to be off when the cassette holder is in the cassette releasing position;

a solenoid connected in series with a normallyclosed ejection switch between the second stationary contact of the motor switch and the other terminal of the power source, and adapted to hold the movable contact of the motor switch on the second stationary contact side when excited;

an ejecting operation member for temporarily turning off the ejection switch;

a driving rotator normally rotated by the motor;

a driven rotator adapted to hold the movable contact of the motor switch on the second stationary contact side when located in a first pause position off the driving rotator, and to be rotated by the rotatory force of the driving rotator when engaged therewith;

an ejection mechanism actuated by the rotatory force of the driven rotator to move the cassette holder from the cassette loading position to the cassette releasing position; and a rotation transmission control member adapted to normally hold the driven rotator in the first pause position off the driving rotator, to hold the driven rotator in a second pause position off the driving rotator immediately before the driven rotator engages the driving rotator after once releasing the driven rotator, urged by the solenoid, when the solenoid is excited, and to hold the driven rotator again in the first pause position after releasing the driven rotator again to cause the driven rotator to engage the driving rotator so that the ejection mechanism is actuated when the solenoid is deenergized.

2. The cassette tape recorder according to claim 1, wherein said ejection mechanism can be also manually actuated to move the cassette holder from the cassette loading position to the cassette releasing position by moving the ejecting operation member through a greater distance than the distance required for changing the ejection switch from "on" to "off".

3. The cassette tape recorder according to claim 1, wherein said motor switch, changeover switch, ejection switch, solenoid, driven rotator, and rotation transmission control member are integrally mounted on a unit chassis, which is removably attached to the chassis of the tape recorder.

4. The cassette tape recorder according to claim 1, wherein a starting switch capable of manual "on"-"off" transfer operation is connected in series with the changeover switch.

* * * * *